United States Patent [19]

Kracklauer

[11] 4,049,618
[45] Sept. 20, 1977

[54] POLYVINYL CHLORIDE COMPOSITION CONTAINING FERROCENE SMOKE SUPPRESSANT ADDITIVES

[75] Inventor: John J. Kracklauer, Boulder, Colo.

[73] Assignee: Syntex (U.S.A.) Inc., Palo Alto, Calif.

[21] Appl. No.: 486,717

[22] Filed: Sept. 5, 1974

Related U.S. Application Data

[63] Continuation-in-part of Ser. No. 227,254, Feb. 17, 1972, abandoned.

[51] Int. Cl.² .............................................. C08J 3/20
[52] U.S. Cl. ........................ 260/45.75 P; 260/2.5 AJ; 260/77.5 AB; 260/DIG. 43; 526/4
[58] Field of Search .................... 260/2.5 AJ, 45.75 P, 260/77.5 AB; 526/4

[56] References Cited

U.S. PATENT DOCUMENTS 3,985,828  10/1976  Lucas ............................ 260/45.75 P

FOREIGN PATENT DOCUMENTS 795,480    8/1973  Belgium
1,200,739  7/1970  United Kingdom Primary Examiner—Eugene C. Rzucidlo
Attorney, Agent, or Firm—Lawrence S. Squires; Tom M. Moran; William B. Walker

[57] ABSTRACT

The use of dicyclopentadienyl iron, or derivatives thereof, in physical mixture with polyvinyl chloride plastics to produce polyvinyl chloride plastic having reduced smoke generating properties.

8 Claims, No Drawings 4,049,618

POLYVINYL CHLORIDE COMPOSITION CONTAINING FERROCENE SMOKE SUPPRESSANT ADDITIVES

CROSS-REFERENCE TO RELATED APPLICATION

This application is a continuation-in-part of application Ser. No. 227,254, filed Feb. 17, 1972, now abandoned.

BACKGROUND OF THE INVENTION

1. The Invention

This invention relates to polymer formulation additives which impart a surprising reduction in smoke production to the plastic product upon combustion. In a further aspect, the invention relates to the use of dicyclopentadienyl iron and derivatives thereof, as smoke suppression additives in plastics. In a still further aspect, this invention relates to processes of increasing the smoke suppression properties of polyvinyl chloride plastics by the physical admixture of a small amount of dicyclopentadienyl iron, or derivatives thereof, and to the resulting polyvinyl chloride plastic having improved smoke suppression properties.

2. The Prior Art

Dicyclopentadienyl iron (ferrocene) has been used as a smoke reducing additive for hydrocarbon fuels — see U.S. Pat. Nos. 3,294,685 and 3,341,311. This body of art is directed to the use of ferrocene and derivatives thereof, as a combustion catalyst to increase the quality of fuel combustion and, therefore, is directed to the increase of the overall flammability of the fuel.

Dicyclopentadienyl iron has also been employed as a flame retardant additive in polymers but in conjunction with chlorine and/or bromine containing compounds and, often, phosphorus and antimony containing compounds — see Belgium Pat. No. 621,125, British Pat. No. 1,049,333 and U.S. Pat. No. 3,269,963. Although smoke reduction in polymers has been disclosed with other, unrelated additives — see British Pat. No. 1,080,468 — it is generally well-known that the use of flame retardant additives, e.g., ferrocene, in polymers, often leads to increased smoke production — see papers by Einhorn and Gaskill in the University of Utah Polymer Conference (June 15–16, 1970), pages 29, 52.

The use of ferrocene as a plastics additive has been broadly suggested by the art for a number of purposes other than smoke suppression, for example, U.V. light stabilizing in polyvinyl chloride — see *J. Appl. Poly. Sci.* 12(7), 1543 (1968); as an additive for improving corona resistance in plastics used as electrical insulating material, see British Pat. No. 1,200,739.

Now it has been discovered that polymer materials, especially polyvinyl chloride plastics, having reduced smoke generating properties, can be obtained by the simple physical addition of certain effective amounts of dicyclopentadienyl iron or derivatives thereof.

SUMMARY

In summary, the process of the invention comprises admixing about from 0.1 to 1%, wt., dicyclopentadienyl iron, or derivatives thereof, with polyvinyl chloride polymer. In summary the composition of the invention comprises a polyvinyl chloride having improved smoke suppression properties due to the physical incorporation therein, chemically uncombined with the polyvinyl chloride polymer, of from 0.1 to 1% dicyclopentadienyl iron or mixtures thereof. The invention will be further described herein below.

FURTHER DESCRIPTION OF THE INVENTION AND PREFERRED EMBODIMENTS

The polyvinyl chloride plastics, of the invention, contain dicyclopentadienyl iron, or derivatives thereof, in chemically uncombined mixture therewith, in an amount sufficient to effectively reduce the quantity of smoke generated by the polyurethane upon combustion.

I have found that the desired improvement in smoke suppression is typically obtained by using quantities of dicyclopentadienyl iron, or derivatives thereof, in the range of about from 0.1 to 1%, by wt., based on the polyvinyl chloride polymer and that typically best results are obtained by using about from 0.25 to 0.5%, by wt., of the additive, based on the weight of the polyvinyl chloride polymer. The amount of additive used is critical since quantities of the additives below 0.1% wt. are generally ineffective to produce any reduction in smoke generation and quantities of the additive above the prescribed range can have an adverse effect on flammability by functioning as a combustion catalyst for the plastic.

Suitable dicyclopentadienyl iron compounds which can be used include, for example, dicyclopentadienyl iron (ferrocene); mono and di lower (1 to 8 carbons) alkyl dicyclopentadienyl iron compounds, e.g., ethyldicyclopentadienyl iron, n-butyldicyclopentadienyl iron, diethyldicyclopentadienyl iron, and di-n-butyldicyclopentadienyl iron; mono and di lower (1 to 8 carbons) alkanoyl dicyclopentadienyl iron compounds, e.g., acetyldicyclopentadienyl iron, butyryldicyclopentadienyl iron, diacetyldicyclopentadienyl iron, and dibutyryldicyclopentadienyl iron; mono- and di-lower alkylamino-(lower alkyl)-substituted dicyclopentadienyl iron compounds such as, for example, N,N-dimethylaminomethyl cyclopentadienyl iron; the dimer and polymer reaction products of dicyclopentadienyl iron and lower (1 to 8 carbons) alkyl substituted derivatives thereof with aldehydes or ketones, e.g., 2,2-di(ethyldicyclopentadienyl iron)-propane, di(butyldicyclopentadienyl iron)-methane, di(dicyclopentadienyl iron)-methane — see also U.S. Pat. No. 3,437,634. Because of the volatility of ferrocene and its lower molecular weight derivatives, I have found that such additives, although quite suitable for use in rigid polyvinyl chloride, to be unsuitable for prolonged use in flexible polyvinyl since over a prolonged period they will diffuse out of the plastic and will be lost to the atmosphere by evaporation. Accordingly, because the higher molecular weight dicyclopentadienyl iron compounds are characterized by lower volatility properties, they afford the advantages of lower volatile loss of compound upon storage of polymer product and hence are greatly preferred in the case of flexible polyvinyl chloride. Suitable higher molecular weight dicyclopentadienyl iron derivatives refer to such compounds having a molecular weight of at least 360, include both simple high molecular weight ferrocene derivatives such as, for example, monoalkyl and dialkyl substituted ferrocenes, for example, butyldecyl ferrocene, hexadecyl ferrocene, bis-(heptylcyclopentadienyl)-iron, monoalkanoyl and dialkanoyl substituted ferrocenes, for example, lauroyl ferrocene, and also dimers and polymers such as, for example, vinyl ferrocene copolymers with vinyl chloride or acrylic acid methyl methacrylate, or butadiene (see U.S. Pat. No. 3,770,787) or cyclopentane (see U.S. Pat. No.

3,350,369); ferrocene condensation dimers and polymers with aldehydes and ketones, for example, 2,2-poly-(dicyclopentadienyl iron)-propane, see U.S. application Ser. No. 467,533, filed May 6, 1974; ferrocene addition products with polyvinyl chloride and polyvinylidene chloride; and the like. The high molecular weight ferrocene derivatives are known compounds and can be prepared according to known procedures such as, for example, described in J.A.C.S., 74, 3458 (1952), U.S. Pat. Nos. 3,238,185, 3,341,495, 3,350,369, 3,437,634, 3,673,232, 3,770,787 or by obvious modifications of such procedures.

It should also be noted that unlike the combustion products of a number of organo iron compounds such as, for example, iron carbonyl, the combustion products of dicyclopentadienyl iron, and its derivatives, are non-toxic.

Polymer products useful herein include vinyl chloride homopolymer or copolymers containing a minimum of about 50 percent vinyl chloride polymerized in accordance with known methods whether anionic, cationic, free radical, or Ziegler induced and include both rigid and flexible polyvinyl chloride plastics. The polymer product herein can be optionally modified with components which improve various physical characteristics such as plasticizers, flow additives, fillers, release agents, pigments, stabilizers, anti-oxidants, and so forth, or other ingredients, such as barium sulfate, aluminum chloride, metal stearates.

The smoke suppressed polymer products hereof can be prepared in accordance with the invention by any convenient known method including simple blending or by milling, molding, or extruding the components. The dicyclopentadienyl iron compound can also be added during the polymerization process provided the components or other process conditions are mutually inert.

The polymer products of the present invention are useful for the same applications as the parent polymers are known to be used, for example, in automobile and airplane parts, containers, appliances, electrical devices, furniture, bedding, and so forth; and, by virtue of the present invention, are especially useful in applications wherein toxicity and/or smoke production upon (accidental) combustion is particularly to be avoided, such as in building or transportation vehicle parts, furniture and bedding materials. The rigid polyvinyl chloride plastics of the invention can be used in the same manner and for the same purposes as conventional rigid polyvinyl materials, for example, as wall surfacing materials, door frames, conduits, pipe, etc. Similarly, the flexible polyvinyl chloride compositions of the invention can be used in the same manner and for the same purposes as conventional flexible polyvinyl chloride compositions, for example, automotive trims and moldings, upholstery, electrical insulating materials, such as electric wire coating, etc.

Definitions

As used herein above and below, the following terms have the following meaning unless expressly stated to the contrary. The term plastic, is as defined in the Condensed Chemical Dictionary, Seventh Edition, by Reinhold Publishing Corporations at pages 751 and 752, and refers to a material that contains as an essential ingredient an organic substance of large molecular weight, is solid in its finished state, and, at some stage in its manufacture, or in its processing into finished articles, can be shaped by flow (definition from ASTM D883-541).

The terms plastic and resin (q.v.) are used in overlapping senses but resin applies more specifically to the more or less chemically homogeneous polymers used as starting materials in the production of molded articles while plastic signifies the final solid product, which may contain fillers, plasticizers, stabilizers, pigments, etc.

The term alkyl refers to both straight chain and branched chain alkyl groups having from one through 20 carbon atoms. The term lower alkyl refers to both straight chain and branched chain alkyl groups having one through eight carbon atoms.

The term ferrocene refers to dicyclopentadienyl iron.

The term substituted or monosubstitute dicyclopentadienyl iron (or ferrocene), e.g., monoethyl dicyclopentadienyl iron or ethyl dicyclopentadienyl iron, refers to such compounds in which one of the cyclopentadienyl rings is so substituted. The term disubstituted dicyclopentadienyl iron (or ferrocene) refers to such compounds wherein both of the cyclopentadienyl rings are so monosubstituted.

The term polyvinyl chloride plastics, or polyvinyl chloride resins, refers to such plastics or resins containing a vinyl chloride homopolymer or copolymers containing a minimum of about 50% vinyl chloride polymerized in accordance with known methods whether anionic, catonic, free radical, or singularly induced, or the like.

The term flexible polyvinyl chloride chloride refers to polyvinyl chloride plastics or resins containing at least 10 parts by wt. of one or more plasticizers per 100 parts of polyvinyl chloride polymer; typically about from 30 to 80 pph. Typical plasticizers include, for example, dioctyl phthalate, tricresylphosphate, diisodecyl phthalate, and the like. Correspondingly the term rigid polyvinyl chlorides refers to polyvinyl chloride plastics or resins containing less than 10 parts, by wt., of plasticizers per 100 parts of the polyvinyl chloride polymer.

The term "parts" or "pts." refers to parts by weight. The term pph means parts per hundred parts.

A further understanding of the invention can be had from the following non-limiting examples.

EXAMPLE 1

A series of three (0, 1 and 2 percent) ferrocene solutions in the dimethylether of tetraethylene glycol are prepared. polyvinyl chloride (PVC) samples are then immersed in these solutions at 100° C for 15 minutes, then placed in boiling water for 15 to extract the solvent, and then placed in an oven at 110° C for 15 minutes to dry the samples. The dried samples, containing 0, 0.3 and 0.6 percent, respectively, of ferrocene, are then tested by use of the ASTM D635-63 flammability test modified by employing a fume hood and vacuum source separated by a filter paper membrane collector. The vacuum collection system used to trap the smoke generated on combustion provides the following results:

| Sample Treatment | Solvent Only | Solvent + 1% Ferrocene | Solvent + 2% Ferrocene |
|---|---|---|---|
| Weight loss of PVC sample on combustion (mg.) | 486 | 339 | 372 |
| Carbon particles collected in smoke system (mg.) | 17.6 | 6.5 | 4.9 |

EXAMPLE 2

Rigid polyvinyl chloride containing cadmium stearate is formulated as in the following table and the formulation tested in a configuration similar to that of Example 1 and burning the sample within a combustion chamber with a chimney and filter paper collector. A 30 second flame exposure followed by mechanical debridement provides burning weight and smoke data.

| Formulation | Burning Rate mg./min. | Smoke Generation Rate, mg./min. | % Smoke: $\frac{\text{Smoke Wt.}}{\text{Wt. Burned}} \times 100$ |
|---|---|---|---|
| No Ferrocene | 610 | 31 | 5.1 |
| 0.125% Ferrocene | 430 | 12 | 4.4 |
| 0.250% Ferrocene | 420 | 9 | 2.1 |
| 0.50% Ferrocene | 460 | 10 | 2.2 |

EXAMPLE 3

A flexible polyvinyl chloride system containing 60 percent PVC, 40 percent plasticizer, 0.5 percent styrene oxide, and 0.25 percent hydroquinone is formulated as in the following table and tested as described in Example 2 with the following results:

| Formulation | | Burning Rate mg./min. | Smoke Generation Rate, mg./min. | % Smoke |
|---|---|---|---|---|
| Ferrocene | Plasticizer | | | |
| None | Dioctylphthalate (DOP) | 600 | 24 | 4.0 |
| 0.25 | Dioctylphthalate | 620 | 13 | 2.1 |
| 0.50 | Dioctylphthalate | 720 | 18 | 2.5 |
| None | 10% Tricresylphosphate + 30% DOP | 400 | 24 | 6.0 |
| 0.25 | 10% Tricresylphosphate + 30% DOP | 520 | 18 | 3.5 |
| 0.50 | 10% Tricresylphosphate + 30% DOP | 580 | 16 | 2.8 |

EXAMPLE 4

The procedures of Examples 1, 2 and 3 are repeated using each of ethyldicyclopentadienyl iron, n-butyldicyclopentadienyl iron, 2,2-di(ethyldicyclopentadienyl iron)-propane, and the polymeric reaction product of ferrocene and methylol containing approximately 29 percent iron, in lieu of dicyclopentadienyl iron (ferrocene), with similar results.

EXAMPLE 5

In this example polyvinyl chloride plastics containing 2,2-di-(ethylferrocenyl)-propane dimer additives are prepared and tested for smoke generation and charring and compared with the corresponding control plastic identical to the test plastics but not containing the additive. The basic formulation and control plastic contains 100 parts, by wt., polyvinyl chloride resin, two parts, by wt., of a butyltin stabilizer, and 50 parts, by wt., of either a dioctyl phthalate plasticizer or a $C_{22}$ low volatility phthalate plasticizer. The compositions are identically tested for % smoke and % clar using an Arapahoe smoke chamber consisting of a cylindrical combustion chamber 5 inches in diameter mounted vertically with an ignition orifice at its lower edge measuring 2.5 inches wide and 2.2 inches high. The sample (1½ × 1 × ⅛ inch in size) is supported horizontally 1¾ inches from the bottom of the stabilizer. The flame source used in a microbunsen burner fired with 60 cc. per minute of natural gas (1.67 B.t.u. per minute. Heat flux). The bunsen burner is positioned such that the tip of the inner blue cone of the flame impinges the lower edge of the sample at a 210° angle. The combustion chamber is fitted with a 3 inch diameter × 24 inch high chimney to cool the combustion gases. The gases and entrained smoke impinge on a filter papper covering the orifice of a high capacity vacuum source. The velocity at the ignition orifice is 180 feet/minutes, the chamber velocity is 50 feet/minutes, and the chimney velocity is 145 feet per minute. This is sufficient to entrain all the smoke produced during combustion for collection on the filter paper. The sample is weighed before and after final exposure and the loss of volatile products recorded. Similarly, the filter paper is weighed before and after and the smoke weight recorded. The char is then removed from the sample by mechanical debridement of char and the char weight is determined as the difference between the intermediate and final sample weight. Smoke weight and char weight are reduced to percentages by respectively dividing by the amount involved in the combustion and then multiplying by 100. Under this test a low smoke percent and a high char index are desirable.

The results of these tests are summarized in the following table.

| ADDITIVE | PTS. BY WT. | PLASTICIZER | % SMOKE | % CHAR |
|---|---|---|---|---|
| none (control) | — | dioctyl phthalate | 8.3 | 11 |
| 2,2-di-(ethylferrocenyl)-propane dimer | 0.63 | dioctyl phthalate | 4.7 | 23 |
| none (control) | — | $C_{22}$-phthalate | 9.4 | 9.1 |
| 2,2-di-(ethylferrocenyl)-propane dimer | 0.63 | $C_{22}$-phthalate | 4.9 | 22 |

EXAMPLE 6

In this example polyvinyl chloride compositions are prepared using the respective ferrocene derivative additives indicated in the following table and then tested for smoke generation and char in the same manner as described in Example 6, and compared against the identical polyvinyl chloride plastic but without the additive. A quantity of the indicated ferrocene derivative additive equivalent in iron content to 0.5 parts, by wt., of ferrocene is used in each sample. The base or control composition contains 100 part, by wt., of polyvinyl chloride resin, 50 parts, by wt., of a mixed $C_7$ to $C_{11}$ phthalate plasticizer and two parts, by wt., of a butyltin stabilizer. The results of these tests are summarized in the following table.

| ADDITIVE | % SMOKE | % CHAR |
|---|---|---|
| none (control) | 11.9 | 9.5 |
| 2,2-di-(ethylferrocenyl)-propane dimer | 5.9 | 24.0 |
| butyryl ferrocene | 5.6 | 23.3 |
| butyl ferrocene | 6.5 | 23.5 |
| benzoyl ferrocene | 5.3 | 25.1 |
| ferrocene carboxylic acid | 6.0 | 23.7 |
| carbomethoxy ferrocene | 6.3 | 23.9 |
| lauroyl ferrocene | 5.6 | 25.0 |
| diferrocenylmethane | 5.7 | 25.0 |
| 2,2-diferrocenylpropane | 5.8 | 23.8 |

-continued

| ADDITIVE | % SMOKE | % CHAR |
|---|---|---|
| 2,2-di(t-butylferrocenyl)-propane | 4.9 | 21.8 |

EXAMPLE 7

In this example, polyvinyl chloride compositions containing ferrocene and stabilized against thermal degradation by a barium-cadmium zinc — phosphite system are evaluated for smoke generation and compared to a control not containing ferrocene. The basic formulation is 100 parts polyvinyl chloride resin, 67 parts of dioctyl phthalate plasticizer, 2 parts of a combination of barium and cadmium soaps stabilizer, sold under the trademark Mark LL, and 0.25 parts of a zinc phosphite stabilizer, sold under the trademark Mark PL, by Argus Chemical Corporation. The smoke and char performance is evaluated as in Example 5. The results of these tests are summarized in the following table:

| ADDITIVE | PTS. BY WT. | % SMOKE | % CHAR |
|---|---|---|---|
| None | — | 3.5 | 9.1 |
| Ferrocene | 0.42 | 2.8 | 16.1 |

Obviously, many modifications and variations of the invvention, described herein above and in the claims, can be made without departing from the essence and scope thereof.

What is claimed is:

1. A polyvinyl chloride plastic containing as a smoke suppression additive a dicyclopentadienyl iron compound incorporated in said plastic in chemically uncombined form and in smoke reducing effective amounts of about from 0.1 to about 1.0%, by weight, based on the polyvinyl chloride polymer content of said plastic, and wherein said dicyclopentadienyl iron compound is selected from the group consisting of dicyclopentadienyl iron, monoalkyldicyclopentadienyl iron; dialkyldicyclopentadienyl iron, monoalkanoyldicyclopentadienyl iron; dialkanoyldicyclopentadienyl iron; the dimer and polymer reaction products of dicyclopentadienyl iron, and alkyl substituted derivatives thereof, with aldehydes or ketones; and mixtures thereof, and wherein as used with respect to said dicyclopentadienyl iron compounds, the terms alkyl and alkanoyl refer to alkyl groups and alkanoyl groups having from one to eight carbon atoms.

2. The product according to claim 1 wherein said dicyclopentadienyl iron compound is selected from the group consisting of dicyclopentadienyl iron; ethyldicyclopentadienyl iron; n-butyldicyclopentadienyl iron; diethyldicyclopentadienyl iron; di-n-butyldicyclopentadienyl iron; acetyldicyclopentadienyl iron; butyryldicyclopentadienyl iron; diacetyldicyclopentadienyl iron; dibutyryldicyclopentadienyl iron; 2,2-di(ethyldicyclopentadienyl iron)-propane; di(butyldicyclopentadienyl iron)-methane; di(dicyclopentadienyl iron)-methane; and mixtures thereof.

3. The polyvinyl chloride plastic of claim 2, wherein said dicyclopentadienyl iron compound is selected from dicyclopentadienyl iron, ethyldicyclopentadienyl iron, and n-butyldicyclopentadienyl iron.

4. The product according to claim 3 wherein said dicyclopentadienyl iron compound is dicyclopentadienyl iron.

5. The product according to claim 4 wherein said smoke reducing effective amount is from about 0.25 to about 0.5% by weight.

6. The composition of claim 4 wherein said polyvinyl chloride plastic is rigid polyvinyl chloride plastic.

7. Polyvinyl chloride compositions which contain in chemically uncombined form 0.1 to 1%, by wt., based on the polyvinyl chloride polymer content, of an additive selected from the group consisting of ferrocene, ferrocene substituted with at least one alkyl group containing one to eight carbon atoms and keto ferrocene having at least one alkyl group with one to seven carbon atoms joined to the ferrocene nucleus via a CO- group.

8. The compositions of claim 7 wherein said compositions contain 0.25 to 0.5%, by wt., based on the polyvinyl chloride content, of said additive.

* * * * *